(12) United States Patent
Guo et al.

(10) Patent No.: US 11,187,605 B2
(45) Date of Patent: Nov. 30, 2021

(54) SEALING GLASS GEOMETRIES FOR SENSITIVITY ENHANCEMENT OF THICK-FILM PIEZORESISTIVE PRESSURE SENSORS

(71) Applicant: Continental Powertrain USA, LLC, Auburn Hills, MI (US)

(72) Inventors: Zhijun Guo, Buffalo Grove, IL (US); Jeffrey Frye, Grayslake, IL (US); Paul Haack, Woodstock, IL (US); Richard Cronin, Long Grove, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 182 days.

(21) Appl. No.: 16/532,758

(22) Filed: Aug. 6, 2019

(65) Prior Publication Data
US 2021/0041317 A1     Feb. 11, 2021

(51) Int. Cl.
*G01L 19/06*     (2006.01)
*G01L 9/00*      (2006.01)

(52) U.S. Cl.
CPC ........ *G01L 19/0627* (2013.01); *G01L 9/0048* (2013.01); *G01L 9/0052* (2013.01)

(58) Field of Classification Search
CPC ... G01L 9/0042; G01L 9/0048; G01L 9/0052; G01L 19/0627; G01L 2009/0066
See application file for complete search history.

(56) References Cited

U.S. PATENT DOCUMENTS

| 4,040,172 A | * | 8/1977 | Kurtz | .................... | G01L 9/0042 |
| | | | | | 438/51 |
| 4,454,771 A | * | 6/1984 | Shimazoe | ................. | G01L 1/18 |
| | | | | | 73/777 |
| 7,487,681 B1 | | 2/2009 | Allen | | |

FOREIGN PATENT DOCUMENTS

DE     10221219 A1    12/2003
DE   102005061142 A1    6/2007

* cited by examiner

*Primary Examiner* — Benjamin R Schmitt

(57) ABSTRACT

A pressure sensor assembly, which includes a pressure sensing element having a diaphragm, a plurality of piezoresistors connected to the diaphragm, and at least one layer of sealing glass connected to the diaphragm. The pressure sensor assembly also includes a base, a layer of sealing glass is connected to the base, and is configured to maximize the sensitivity of the plurality of piezoresistors via tailoring the side surfaces of the glass surface to control the deformable diaphragm. The layer of sealing glass includes a first recess portion, and a second recess portion formed as part of the layer of sealing glass on the opposite side of the layer of sealing glass as the first recess portion. One of the plurality of piezoresistors is partially surrounded by the first recess portion, and another of the plurality of piezoresistors is partially surrounded by the second recess portion.

21 Claims, 7 Drawing Sheets

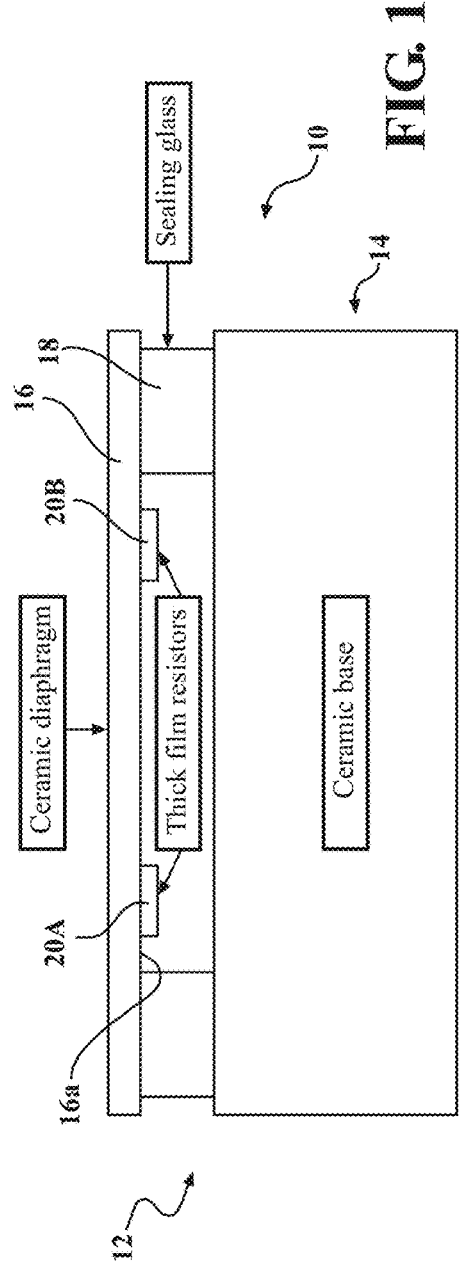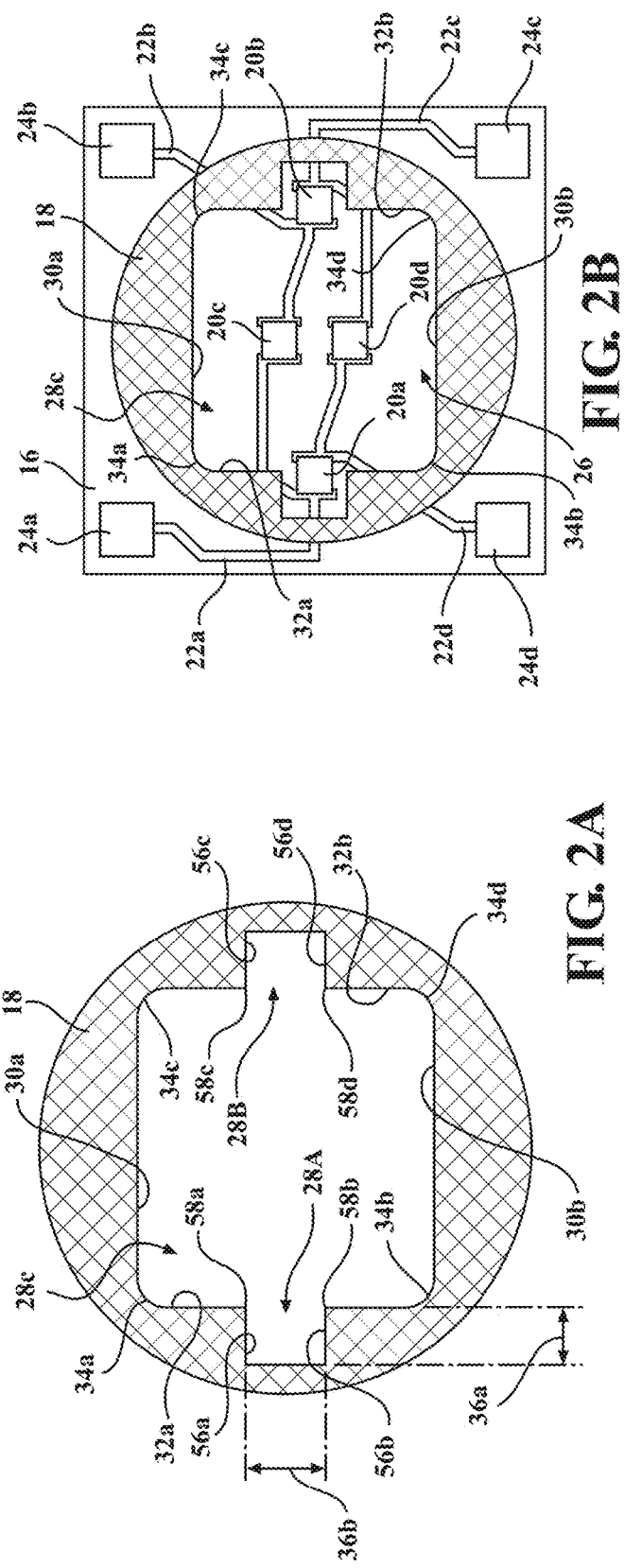

SEALING GLASS GEOMETRIES FOR SENSITIVITY ENHANCEMENT OF THICK-FILM PIEZORESISTIVE PRESSURE SENSORS

FIELD OF THE INVENTION

Embodiments of the invention relate to a thick-film piezoresistive pressure sensor having sealing glass geometries which define the deformable diaphragm shape, thereby increasing the sensitivity of the Wheatstone bridge circuit, improving accuracy.

BACKGROUND OF THE INVENTION

Thick-film piezoresistive pressure sensors are generally known and widely used. One type of pressure sensor is an absolute pressure sensor which includes a pressure sensing element made of ceramic which is bonded to a ceramic base via glass frit bonding to form a reference vacuum. The pressure sensing element includes four piezoresistors connected into what is known as a "Wheatstone Bridge" configuration, which are used for detecting changes in pressure. The pressure sensing element consists of a base, a diaphragm, which deflects when exposed media applying pressure to the diaphragm, and bonding frit glass of finite height, which defines the maximum displacement of the diaphragm.

Many absolute pressure sensors are used in applications in which the sensors are exposed to a harsh media. One of these types of applications is for a compressor in an air conditioning system. Most current pressure sensors used in air conditioning systems have piezoresistors with limited sensitivity. Additionally, the Application-Specific Integrated Circuit (ASIC) gain is too high because of the low sensitivity of the current designs of piezoresistor-cell sensing elements of thick-film resistors on ceramic diaphragms.

Accordingly, there exists a need for a pressure sensor assembly with improved sensitivity, without causing an increase in size, or an increase in cost.

SUMMARY OF THE INVENTION

In an embodiment, the present invention is a pressure sensor assembly which improves performance by tailoring sealing glass geometry, allowing the deformation of the diaphragm to be controlled in a way that the strain of the Wheatstone bridge resistors may be significantly enhanced. Thus, the change of the resistance of the resistors may be increased, which leads to higher output of the Wheatstone bridge circuit, which increases the sensitivity.

The pressure sensor assembly also provides the additional benefit of higher sensitivity, which allows for smaller size of the piezoresistors-cell, thus reducing the cost, while maintaining the same performance. The unique shapes of the layer of sealing glass may also accommodate other features like an NTC thermistor contact area.

In an embodiment, the present invention is a pressure sensor assembly, which includes a pressure sensing element having a diaphragm, a plurality of piezoresistors connected to the diaphragm, and at least one layer of sealing glass connected to the diaphragm. The pressure sensor assembly also includes a base, the layer of sealing glass is connected to the base, and is configured to maximize the sensitivity of the plurality of piezoresistors.

In an embodiment, the layer of sealing glass includes a first recess portion, and a second recess portion formed as part of the layer of sealing glass on the opposite side of the layer of sealing glass as the first recess portion. One of the plurality of piezoresistors is partially surrounded by the first recess portion, and another of the plurality of piezoresistors is partially surrounded by the second recess portion.

In an embodiment, the layer of sealing glass further comprises a first side surface and a second side surface. The first recess portion is integrally formed as part of the first side surface, and the second recess portion is integrally formed as part of the second side surface. In an embodiment, the first side surface is formed as part of the layer of sealing glass on the opposite side of the layer of sealing glass as the second side surface.

In an embodiment, the first recess portion includes at least one side surface, and at least one fillet. The at least one side surface formed as part of the first recess portion and the first side surface terminate into the at least one fillet. In an embodiment, the angle between the side surface and the first side surface is greater than or equal to ninety degrees. In another embodiment, the angle between the at least one side surface and the first side surface is less than or equal to ninety degrees.

In an embodiment, the second recess portion includes at least one side surface and at least one fillet. The at least one side surface formed as part of the second recess portion and the second side surface terminate into the at least one fillet. In one embodiment, the angle between the at least one side surface and the second side surface is greater than or equal to ninety degrees. In another embodiment, the angle between the at least one side surface and the second side surface is less than or equal to ninety degrees.

In an embodiment, the layer of sealing glass includes a first inner surface, and a second inner surface formed as part of the layer of sealing glass on the opposite side of the layer of sealing glass as the first inner surface.

In an embodiment, the layer of sealing glass includes a first arc portion, a second arc portion, a third arc portion, and a fourth arc portion. An end of the first side surface and an end of the first inner surface both terminate into a first arc portion. A second end of the first side surface and a second end of the second inner surface both terminate into a second arc portion. A second end of the second side surface and a second end of the first inner surface both terminate into a third arc portion. A fourth arc portion, an end of the second side surface and an end of the second inner surface both terminate into a fourth arc portion.

In an embodiment the layer of sealing glass includes a multi-sided perimeter circumscribing the layer of sealing glass.

In an embodiment, the layer of sealing glass includes a first curved surface which has a first end that terminates into the first side surface, and a second end that terminates into the second side surface. The layer of sealing glass also includes a second curved surface which has a first end that terminates into the first side surface, and a second end that terminates into the second side surface. The first curved surface is formed as part of the layer of sealing glass on the opposite side of the layer of sealing glass as the second curved surface.

In an embodiment, the layer of sealing glass includes a first elongated curved surface, which has a first end that terminates into the first recess portion, and a second end that terminates into the second recess portion. The layer of sealing glass also includes a second elongated curved surface, which has a first end that terminates into the first recess portion, and a second end that terminates into the second recess portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-sectional view of a pressure sensor assembly, according to embodiments of the present invention;

FIG. 2A is a bottom view of a layer of sealing glass, which is part of a first embodiment of a pressure sensor assembly, according to embodiments of the present invention;

FIG. 2B is a bottom view of a layer of sealing glass and a circuit assembled to a diaphragm, which are used as part of a first embodiment of a pressure sensor assembly, according to embodiments of the present invention;

DETAILED DESCRIPTION OF THE PREFERRED EMBODIMENTS

Figure 3A:
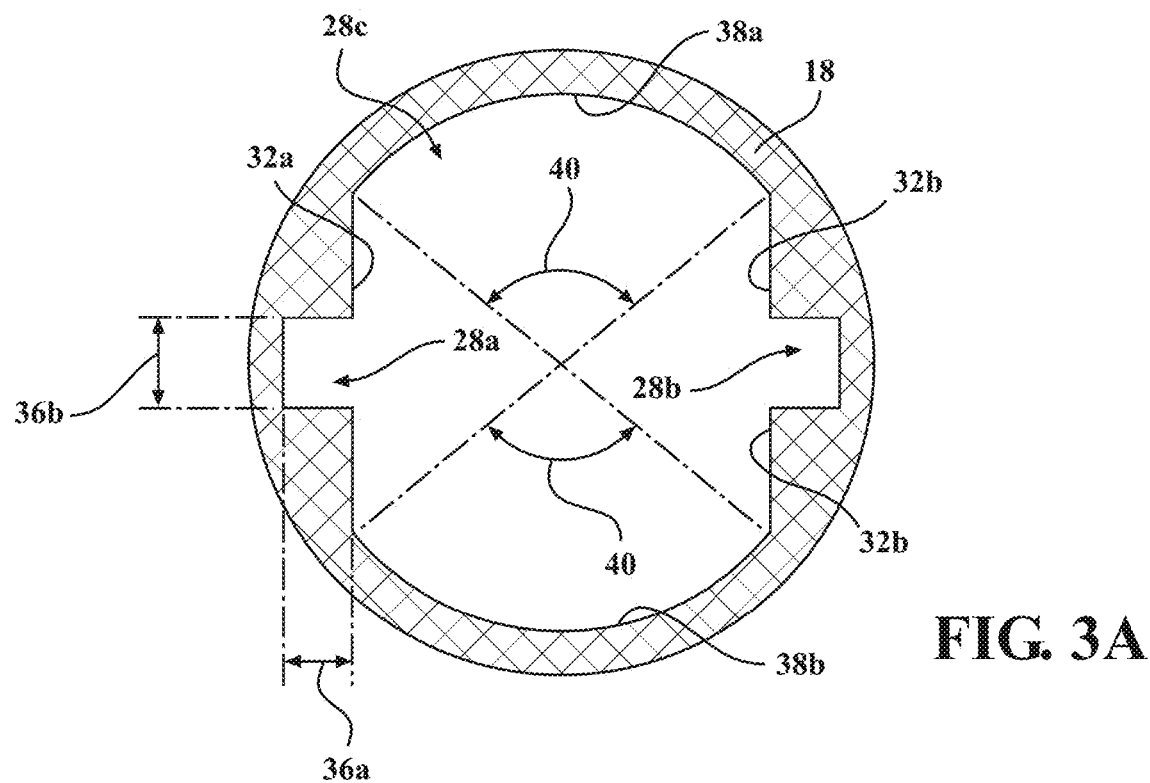
FIG. 3A is a bottom view of a layer of sealing glass, which is part of a second embodiment of a pressure sensor assembly, according to embodiments of the present invention.

The following description of the preferred embodiment(s) is merely exemplary in nature and is in no way intended to limit the invention, its application, or uses.

An example of the pressure sensor assembly according to a first embodiment of the present invention is shown in FIGS. 1-2B generally at 10. The sensor 10 includes a pressure sensing element, shown generally at 12, and a base, which in this embodiment is a ceramic base, shown generally at 14. The pressure sensing element 12 includes a diaphragm, which in this embodiment is a ceramic diaphragm 16, which is supported on a layer of sealing glass 18. Referring to FIG. 2B, attached to a first side 16a of the diaphragm 16 is a plurality of thick-film piezoresistors 20a-20d, and each of the piezoresistors 20a-20d is connected to and in electrical communication with one or more of a plurality of conductive traces 22a-22d, and each of the conductive traces 22a-22d is connected to and in electrical communication with one of a plurality of bond pads 24a-24d. The conductive traces 22a-22d and the bond pads 24a-24d are also connected to the first side 16a of the diaphragm 16. The piezoresistors 20a-20d, the conductive traces 22a-22d, and the bond pads 24a-24d function together as a Wheatstone bridge circuit, shown generally at 26.

Also connected to the first side 16a of the diaphragm 16 is the layer of sealing glass 18. The layer of sealing glass 18 is connected to the first side 16a of the diaphragm 16 such that portions of the conductive traces 22a-22d are disposed between the layer of sealing glass 18 and the diaphragm 16. Referring to FIGS. 2A-2B, the layer of sealing glass 18 is shaped to maximize the sensitivity of the circuit 26 while accommodating other requirements like NTC pressure sensors. More specifically, there is a first recess portion, shown generally at 28A and a second recess portion, shown generally at 28B, both of which are integrally formed as part of the layer of sealing glass 18. The first piezoresistor 20a is partially surrounded by the first recess portion 28a, and the second piezoresistor 20b is partially surrounded by the second recess portion 28b. Each of the recess portions 28a,28b are part of an aperture, shown generally at 28c, which is also formed as part of the layer of sealing glass 18.

The layer of sealing glass 18 is shaped to minimize the interference with the signal generated by the circuit 26 when force from a media is applied to the diaphragm 16. More specifically, in operation, when force is applied to the diaphragm 16, the diaphragm 16 deflects, and this deflection of the diaphragm 16 causes a voltage to be generated in the circuit 26, and this voltage corresponds to the amount of force applied to the diaphragm 16. Also formed as part of the aperture 28c is a first inner surface 30a and a second inner surface 30b, which are substantially parallel to each other. The aperture 28c also includes a first side surface 32a and a second side surface 32b. The first recess portion 28a is integrally formed as part of the first side surface 32a, and the second recess portion 28b is integrally formed as part of the second side surface 32b. In an embodiment, the side surfaces 32a,32b are substantially perpendicular to the corresponding recess portions 28a,28b, but it is within the scope of the invention that the side surfaces 32a,32b may be positioned at various angles relative to the recess portions 28a,28b. Additionally, each recess portion 28a,28b has corresponding side surfaces 56a,56b,56c,56d, shown in FIGS. 2A-2B. There is also a plurality of fillets 58a,58b,58c,58d, where part of the first side surface 32a and the side surface 56a both terminate into the first fillet 58a. Part of the first side surface 32a and the side surface 56b both terminate into the second fillet 58b. Part of the second side surface 32b and the side surface 56c both terminate into the third fillet 58c. Part of the second side surface 32b and the side surface 56d both terminate into the fourth fillet 58d. Although the fillets 58a,58b,58c,58d are shown, it is within the scope of the invention that a finite radius may be used instead of the fillets 58a,58b,58c,58d.

An end of the first side surface 32a and an end of the first inner surface 30a both terminate into a first arc portion 34a. A second end of the first side surface 32a and a second end of the second inner surface 30b both terminate into a second arc portion 34b. A second end of the second side surface 32b and a second end of the first inner surface 30a both terminate into a third arc portion 34c. An end of the second side surface 32b and an end of the second inner surface 30b both terminate into a fourth arc portion 34d.

Each of the recess portions 28a,28b extend a depth 36a and a width 36b, such that the edges of the first recess portion 28a are located a predetermined distance away from the first piesoresistor 20a, and the edges of the second recess portion 28b are located a predetermined distance away from the second piesoresistor 20b, such that a desired level of sensitivity is achieved.

Figure 3B:
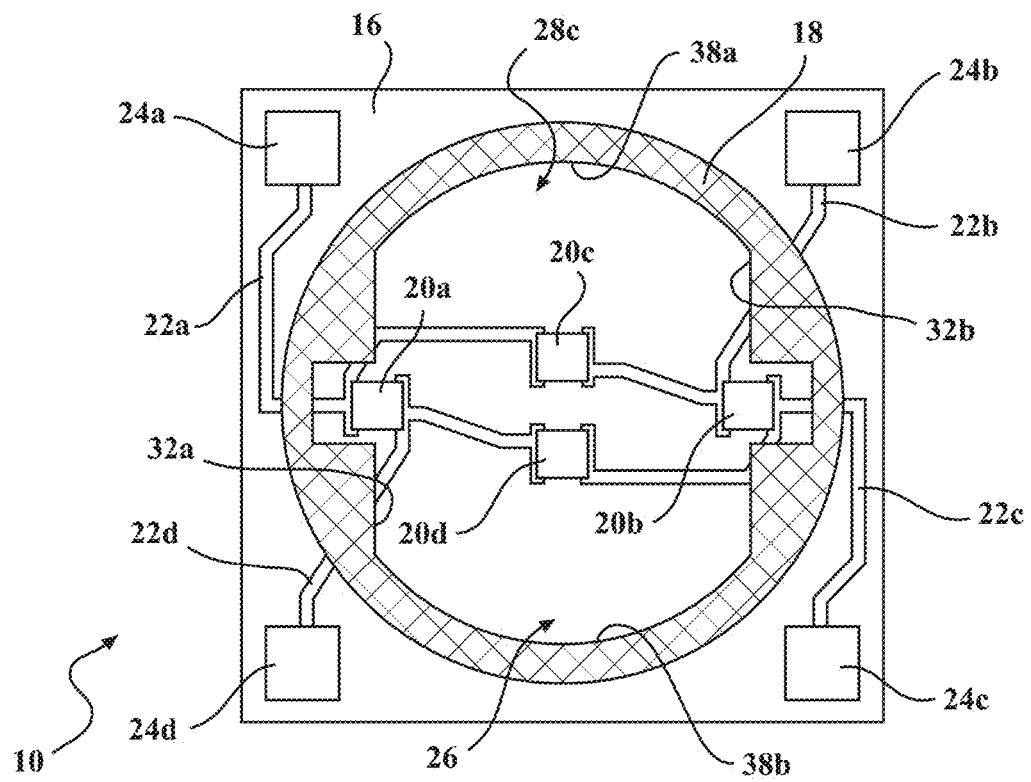
FIG. 3B is a bottom view of a layer of sealing glass and a circuit assembled to a diaphragm, which are used as part of a second embodiment of a pressure sensor assembly, according to embodiments of the present invention.

Another embodiment of the present invention is shown in FIGS. 3A-3B, with like numbers referring to like elements. This embodiment does not have the inner surfaces 30a,30b. Rather, this embodiment includes a first inner curved surface 38a, and a second inner curved surface 38b. The first curved surface 38a has a first end that terminates into the first side surface 32a, and the first curved surface 38a has a second end that terminates into the second side surface 32b. Additionally, the second curved surface 38b has a first end that terminates into the first side surface 32a, and the second curved surface 38b has a second end that terminates into the second side surface 32b. The circumferential length of each of the curved surfaces 38a,38b extend about an angle, indicated at 40, and the circumferential length of each of the curved surfaces 38a,38b is substantially the same. The inside edge of each of the curved surfaces 38a,38b is located a distance away from each of the piezoresistors 20a-20d, such that a desired level of sensitivity is achieved.

Figure 4:
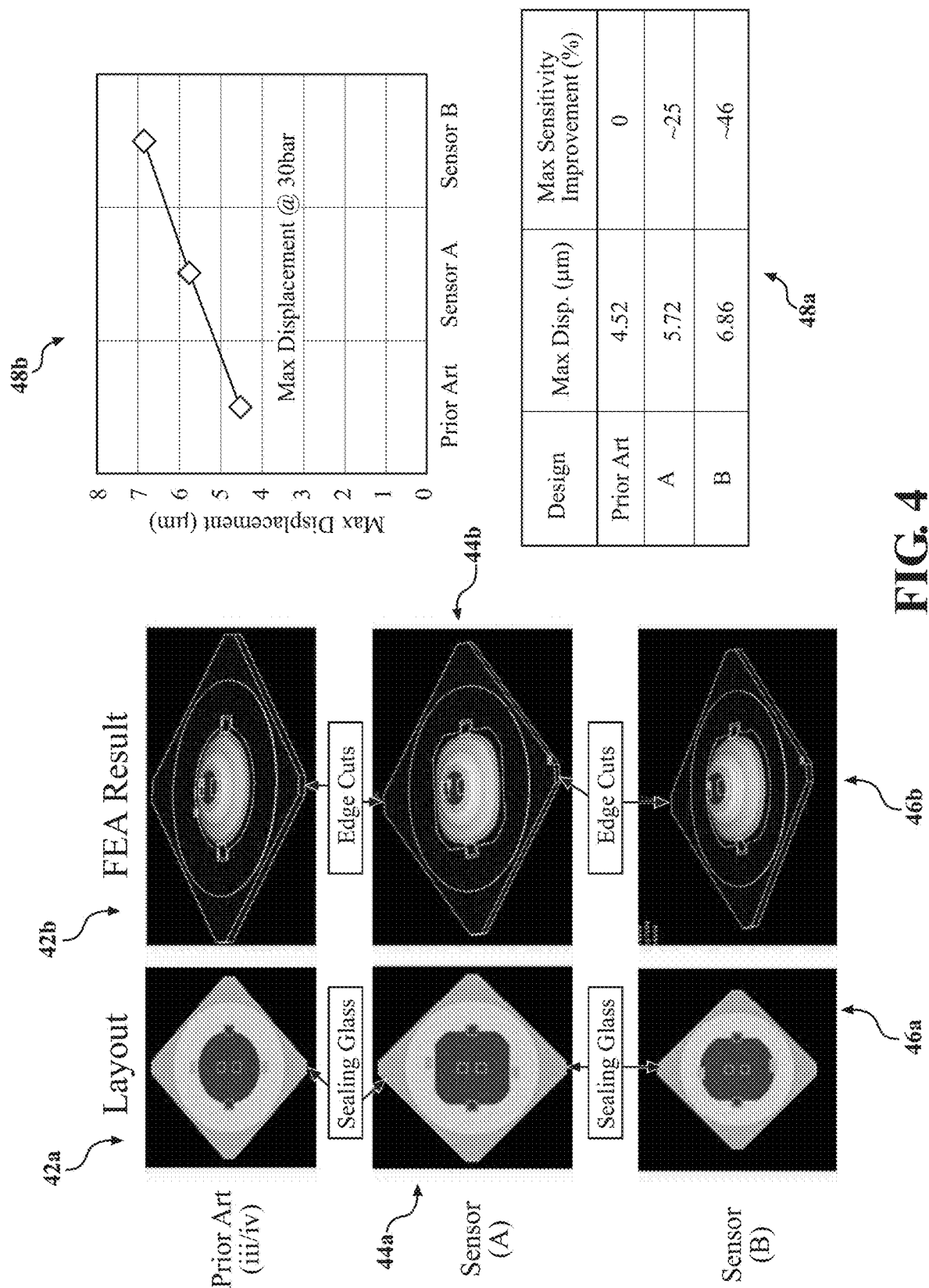
FIG. 4 includes several diagrams and a chart comparing the differences between the voltage output of one prior art pressure sensor and the first and second embodiments of a pressure sensor according to embodiments of the present invention, when each of the sensors is exposed to a pressure of 30 bar.

Referring now to FIG. 4, there are several diagrams and a chart comparing the differences between the voltage output of one prior art pressure sensor, and the two embodiments of a pressure sensor described above, when each of the sensors is exposed to a pressure of 30 bar. As shown in FIG. 4, there is a first diagram 42a of an example of a prior art pressure sensor, and a second diagram 42b of an example of a Finite Element Analysis (FEM) model of a prior art pressure sensor. Also shown in FIG. 4 is a first diagram 44a of a pressure sensor according to the first embodiment, and a second diagram 44b of an example of an FEM model of a pressure sensor according to the first embodiment. FIG. 4 also shows a first diagram 46a of a pressure sensor according to the second embodiment, and a second diagram 46b of an example of an FEM model of a pressure sensor according to the second embodiment.

Also shown in FIG. 4 is a table 48a, which includes the displacement of each of the pressure sensors shown in the diagrams 42a-46b, when each of the pressure sensors is exposed to 30 bar of pressure. A chart showing these measurements is shown generally at 48b. As shown in the table 48a and the chart 48b, the pressure sensor according to the first embodiment shows an improvement of the prior art of approximately 25%, and the pressure sensor according to the second embodiment shows an improvement of approximately 46%. The circuit 26 is configured in relation to the shape of the layer of sealing glass 18 to achieve a desired linear relationship between the displacement of the diaphragm 16 and voltage output of the circuit 26. If the pressure applied to the diaphragm 16 does not exceed a maximum value, the voltage output is a linear function of the applied pressure for the sensing element 12. If the displacement of the diaphragm 16 is too large, the output voltage becomes nonlinear as a function of applied pressure.

Figure 5A:
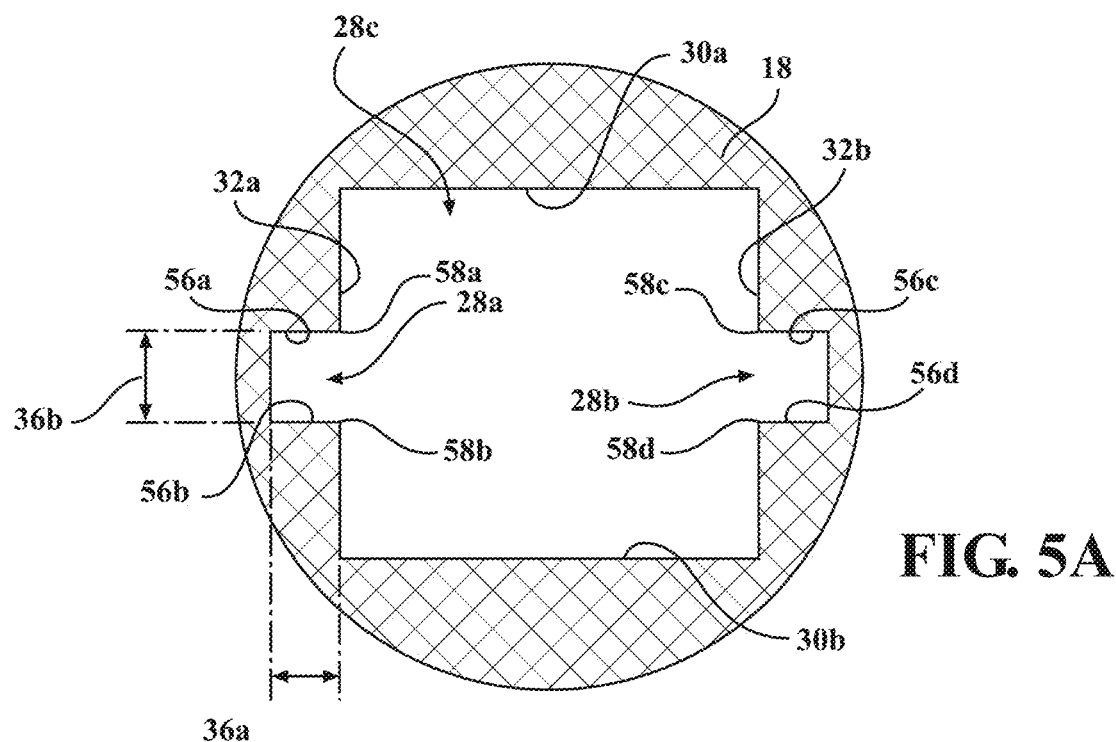
FIG. 5A is a bottom view of a layer of sealing glass, which is part of a third embodiment of a pressure sensor assembly, according to embodiments of the present invention.
Figure 5B:
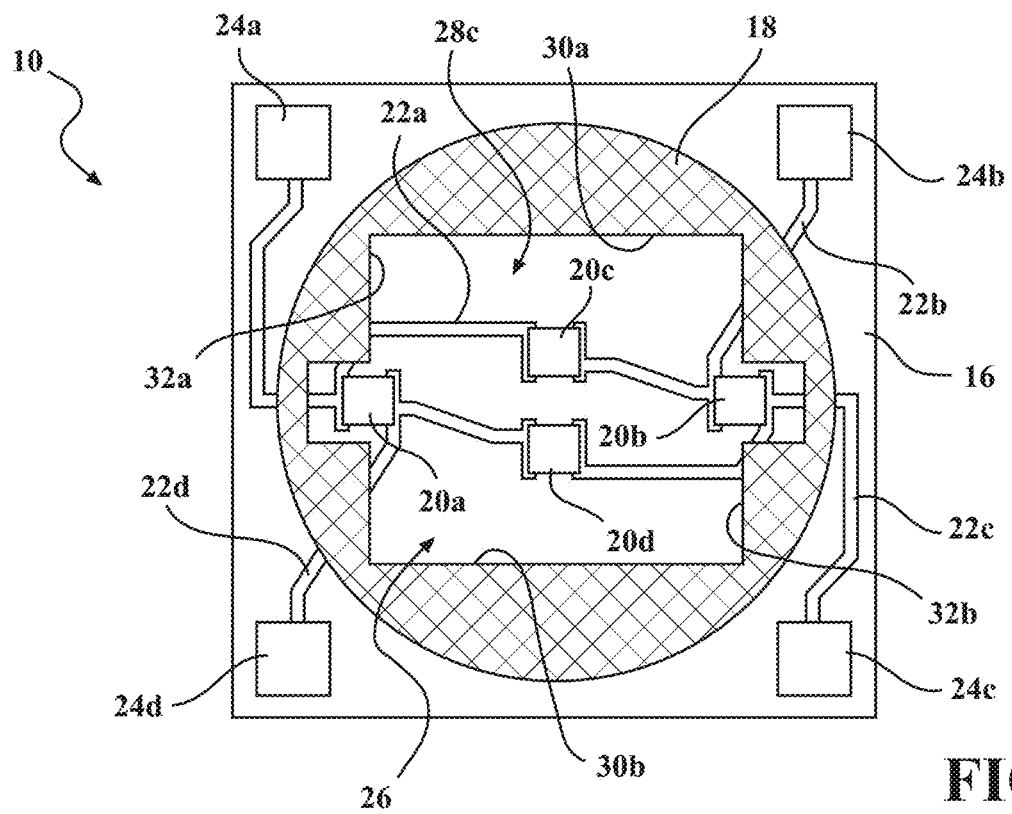
FIG. 5B is a bottom view of a layer of sealing glass and a circuit assembled to a diaphragm, which are used as part of a third embodiment of a pressure sensor assembly, according to embodiments of the present invention.

A third embodiment of the pressure sensor 10 according to the present invention is shown in FIGS. 5A-5B, with like numbers referring to like elements. In this embodiment, the layer of sealing glass 18 is similar to the first embodiment, but in this embodiment the layer of sealing glass 18 does not have the arc portions 34a-34d. Rather, the first end of the first inner surface 30a terminates into the first side surface 32a, and the second end of the first inner surface 30a terminates into the second side surface 32b. Furthermore, the first end of the second inner surface 30b terminates into the second side surface 32b, and the second end of the second inner surface 30b terminates into the first side surface 32a.

Figure 6A:
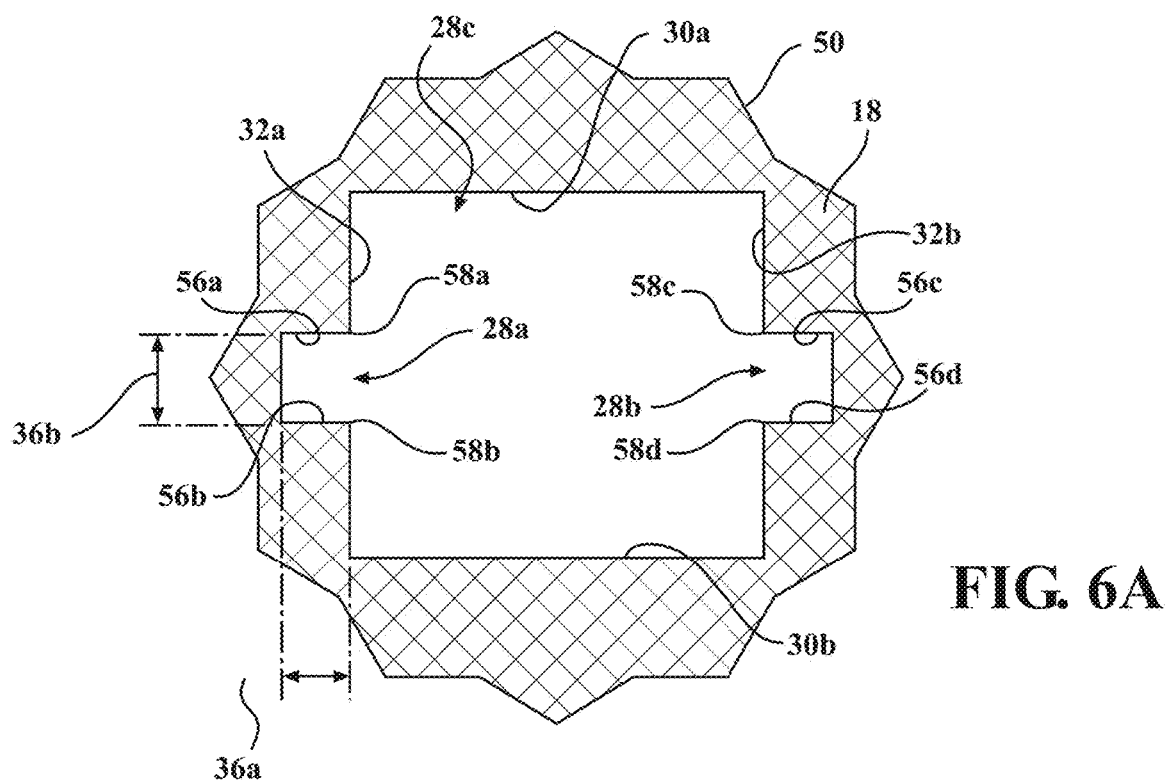
FIG. 6A is a bottom view of a layer of sealing glass, which is part of a fourth embodiment of a pressure sensor assembly, according to embodiments of the present invention.
Figure 6B:
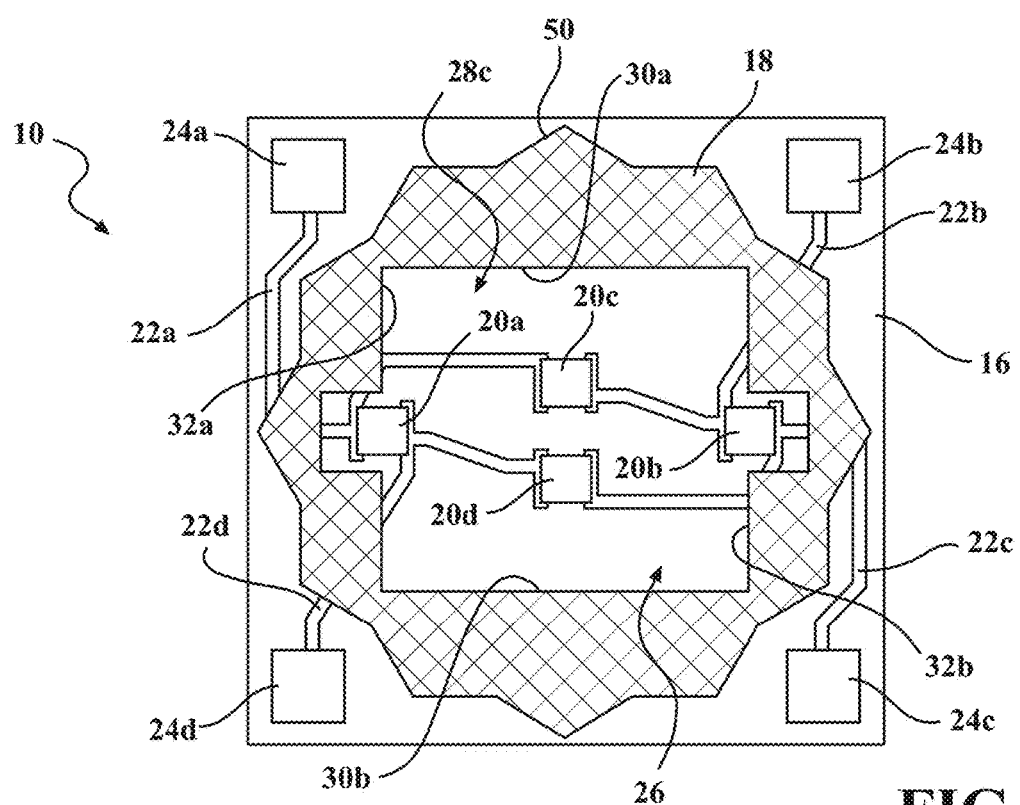
FIG. 6B is a bottom view of a layer of sealing glass and a circuit assembled to a diaphragm, which are used as part of a fourth embodiment of a pressure sensor assembly, according to embodiments of the present invention.

A fourth embodiment of the pressure sensor 10 according to the present invention is shown in FIGS. 6A-6B, with like numbers referring to like elements. In this embodiment, the layer of sealing glass 18 includes the inner surfaces 30a,30b and the side surfaces 32a,32b, but does not include the arc portions 34a-34d. Also, in the previous embodiments, the outer perimeter surface 18a of the layer of sealing glass 18 is substantially circular, however in this embodiment, the layer of sealing glass 18 has a multi-sided perimeter 50. In this embodiment, the multi-sided perimeter 50 has twenty-four flat surfaces. However, it is within the scope of the invention that the multi-sided perimeter may include more or less flat surfaces. It is also within the scope of the invention that the outer perimeter surface 18a may also include other shapes which may be curved or flat, to facilitate the sensor 10 meeting various packaging requirements, and signal routing requirements.

It should be noted that in the embodiments shown in FIGS. 2A,2B 5A,5B,6A,6B, the side surfaces 32a,32b are formed at a ninety-degree angle relative to the inner surfaces 30a,30b, but it is within the scope of the invention that the angle between the side surfaces 32a,32b and the inner surfaces 30a,30b may be greater or less than ninety-degrees, depending on various design requirements.

Figure 7A:
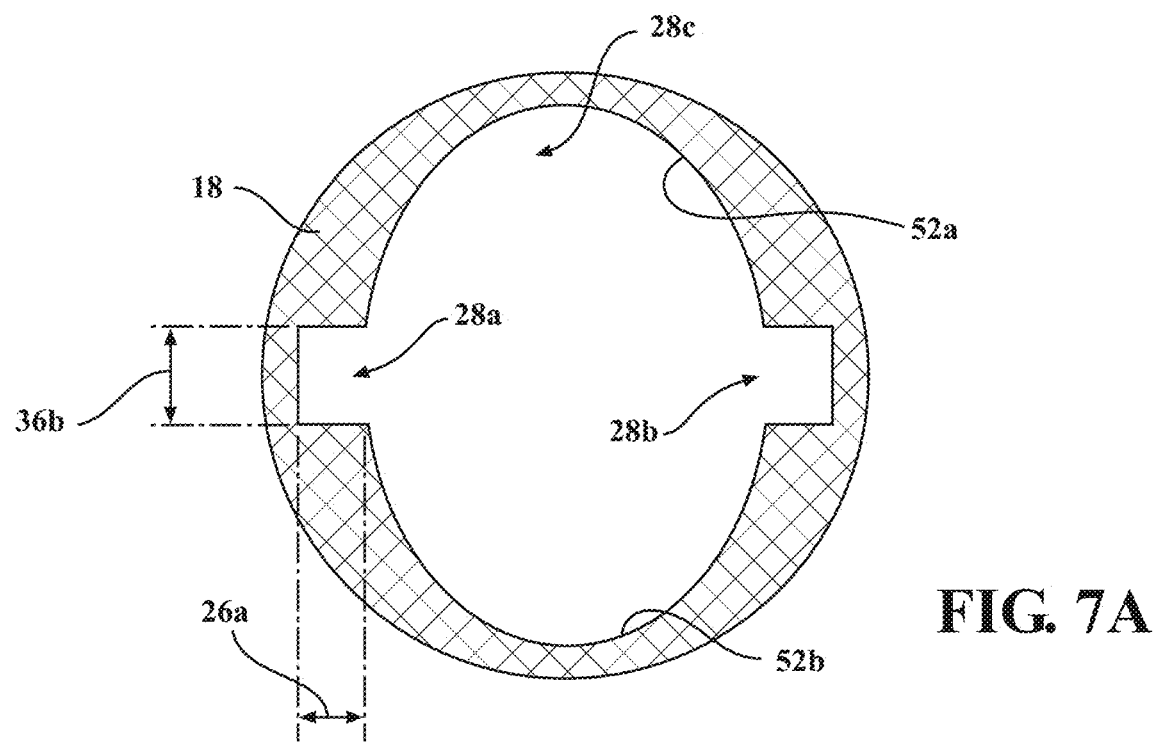
FIG. 7A is a bottom view of a layer of sealing glass, which is part of a fifth embodiment of a pressure sensor assembly, according to embodiments of the present invention.
Figure 7B:
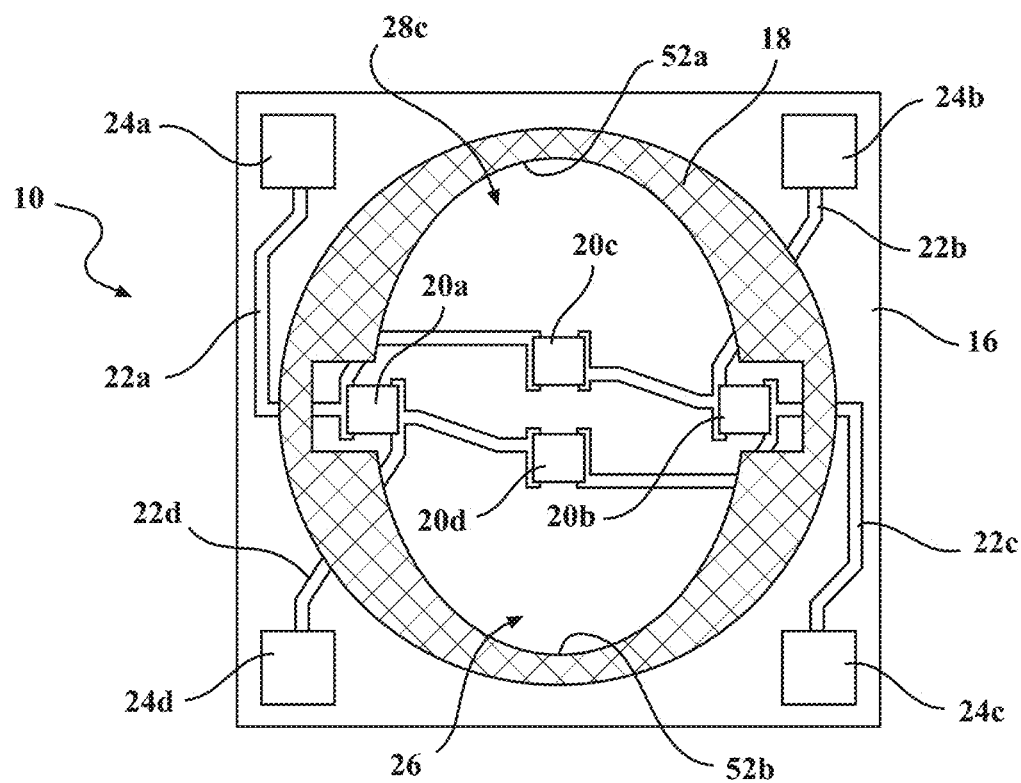
FIG. 7B is a bottom view of a layer of sealing glass and a circuit assembled to a diaphragm, which are used as part of a fifth embodiment of a pressure sensor assembly, according to embodiments of the present invention.

A fourth embodiment of the pressure sensor 10 according to the present invention is shown in FIGS. 7A-7B, with like numbers referring to like elements. In this embodiment, the layer of sealing glass 18 does not include the inner surfaces 30a,30b or the side surfaces 32a,32b. In this embodiment, the layer of sealing glass 18 includes a first elongated curved surface 52a, and a second elongated curved surface 52b. The first elongated curved surface 52a has a first end that terminates into the first recess portion 28a, and the first elongated curved surface 52a has a second end that terminates into the second recess portion 28b. The second elongated curved surface 52b has a first end that terminates into the first recess portion 28a, and the second elongated curved surface 52b has a second end that terminates into the second recess portion 28b. One of the advantages of the layer of sealing glass 18 having the elongated curved surfaces 52a, 52b shown in FIGS. 7A-7B is improved robustness, while maintaining a desired level of sensitivity.

Figure 8A:
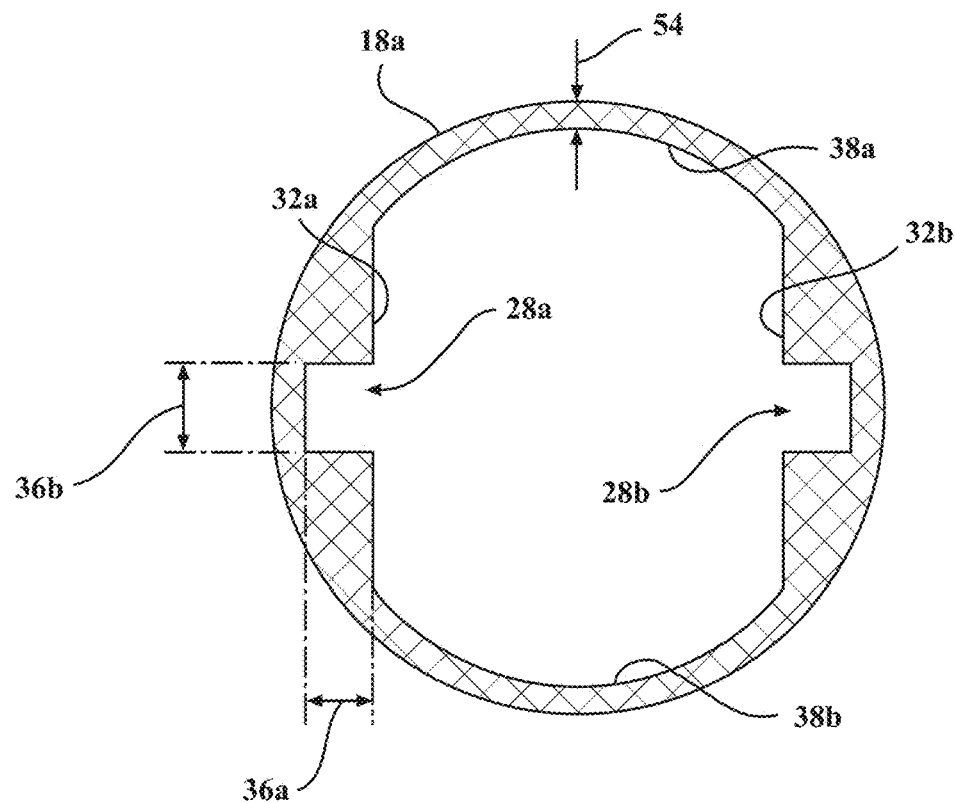
FIG. 8A is a bottom view of a layer of sealing glass, which is part of a sixth embodiment of a pressure sensor assembly, according to embodiments of the present invention.
Figure 8B:
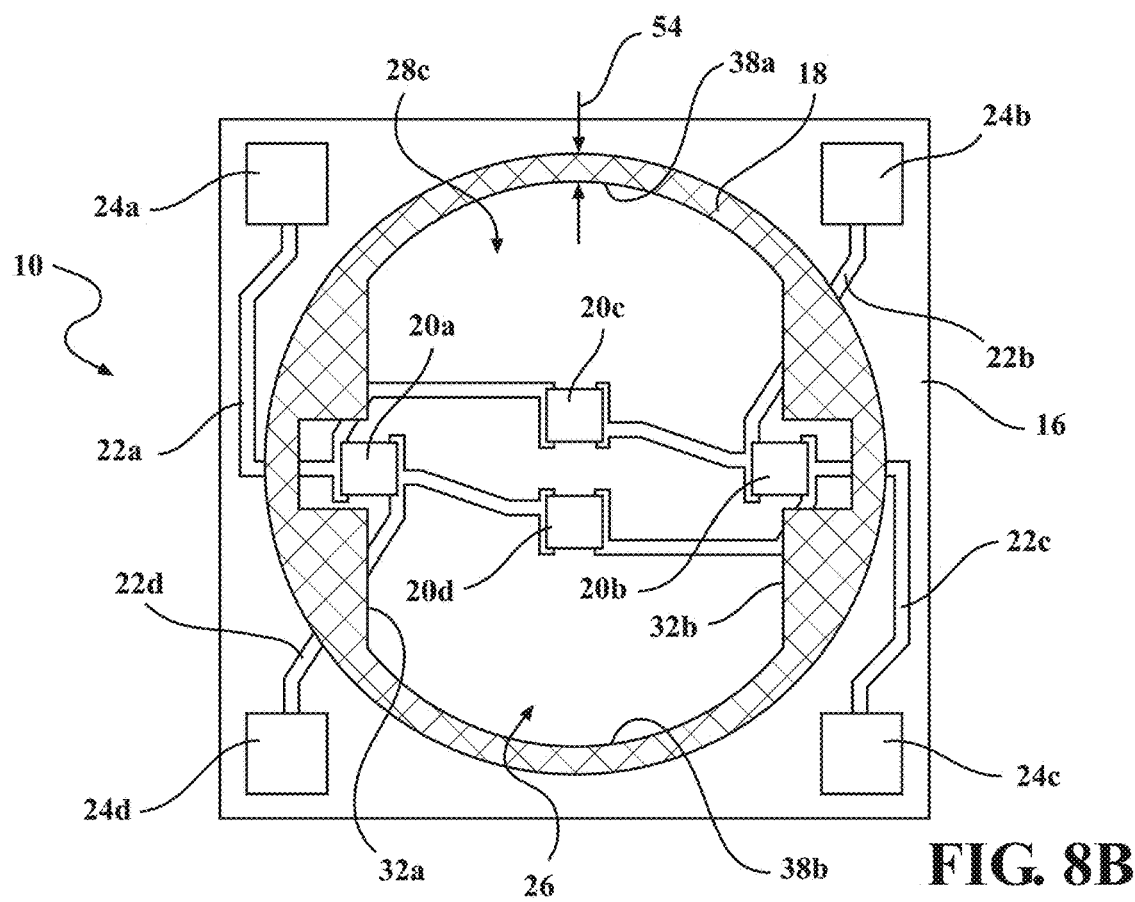
FIG. 8B is a bottom view of a layer of sealing glass and a circuit assembled to a diaphragm, which are used as part of a sixth embodiment of a pressure sensor assembly, according to embodiments of the present invention.

A fifth embodiment of the pressure sensor 10 according to the present invention is shown in FIGS. 8A-8B, with like numbers referring to like elements. In this embodiment, the layer of sealing glass 18 is similar to the layer of sealing glass 18 shown in the second embodiment, but in this embodiment the side surfaces 32a,32b are longer. The first end of the first curved surface 38a again terminates into the first side surface 32a, and the second end of the first curved surface 38a terminates into the second side surface 32b. Also, as with the second embodiment, the first end of the second curved surface 38b terminates into the first side surface 32a, and the second end of the second curved surface 38b terminates into the second side surface 32b. Because the side surfaces 32a,32b are longer, the distance 54 between the first curved surface 38a and the outer perimeter surface 18a is less than compared to this distance 54 in the second embodiment shown in FIGS. 3A-3B. In this embodiment, the distance 54 may be varied such that the sensor 10 may be suitable for various applications requiring different levels of required sensitivity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
a pressure sensor assembly, including:
a pressure sensing element, the pressure sensing element further comprising:
a diaphragm;
a plurality of piezoresistors connected to the diaphragm;
at least one layer of sealing glass connected to the diaphragm; and
a base, the at least one layer of sealing glass connected to the base;
a first recess portion formed as part of the at least one layer of sealing glass; and
a second recess portion formed as part of the at least one layer of sealing glass on the opposite side of the at least one layer of sealing glass as the first recess portion;
wherein one of the plurality of piezoresistors is partially surrounded by the first recess portion, and another of the plurality of piezoresistors is partially surrounded by the second recess portion.

2. The apparatus of claim 1, the at least one layer of sealing glass further comprising:
a first side surface, the first recess portion integrally formed as part of the first side surface; and
a second side surface, the second recess portion integrally formed as part of the second side surface;
wherein the first side surface is formed as part of the at least one layer of sealing glass on the opposite side of the at least one layer of sealing glass as the second side surface.

3. The apparatus of claim 2, the first recess portion further comprising:
at least one side surface;
at least one fillet; and
wherein the at least one side surface formed as part of the first recess portion and the first side surface terminate into the at least one fillet.

4. The apparatus of claim 3, wherein the angle between the at least one side surface and the first side surface is greater than or equal to ninety degrees.

5. The apparatus of claim 3, wherein the angle between the at least one side surface and the first side surface is less than or equal to ninety degrees.

6. The apparatus of claim 2, the second recess portion further comprising:
at least one side surface;
at least one fillet; and
wherein the at least one side surface formed as part of the second recess portion and the second side surface terminate into the at least one fillet.

7. The apparatus of claim 6, wherein the angle between the at least one side surface and the second side surface is greater than or equal to ninety degrees.

8. The apparatus of claim 6, wherein the angle between the at least one side surface and the second side surface is less than or equal to ninety degrees.

9. The apparatus of claim 2, the at least one layer of sealing glass further comprising:
a first inner surface formed as part of the at least one layer of sealing glass; and
a second inner surface formed as part of the at least one layer of sealing glass on the opposite side of the at least one layer of sealing glass as the first inner surface.

10. The apparatus of claim 9, the at least one layer of sealing glass further comprising:
a first arc portion, an end of the first side surface and an end of the first inner surface both terminate into a first arc portion;
a second arc portion, a second end of the first side surface and a second end of the second inner surface both terminate into a second arc portion;
a third arc portion, a second end of the second side surface and a second end of the first inner surface both terminate into a third arc portion; and
a fourth arc portion, an end of the second side surface and an end of the second inner surface both terminate into a fourth arc portion.

11. The apparatus of claim 9, the at least one layer of sealing glass further comprising a multi-sided perimeter circumscribing the at least one layer of sealing glass.

12. The apparatus of claim 9, the at least one layer of sealing glass further comprising:
a first curved surface, the first curved surface has a first end that terminates into the first side surface, and the first curved surface has a second end that terminates into the second side surface; and
a second curved surface, the second curved surface has a first end that terminates into the first side surface, and the second curved surface has a second end that terminates into the second side surface;
wherein the first curved surface is formed as part of the at least one layer of sealing glass on the opposite side of the at least one layer of sealing glass as the second curved surface.

13. The apparatus of claim 1, the at least one layer of sealing glass further comprising:
a first elongated curved surface, the first elongated curved surface has a first end that terminates into the first recess portion, and the first elongated curved surface has a second end that terminates into the second recess portion; and
a second elongated curved surface, the second elongated curved surface has a first end that terminates into the first recess portion, and the first elongated curved surface has a second end that terminates into the second recess portion.

14. A pressure sensor assembly, comprising:
a pressure sensing element;
a diaphragm being part of the pressure sensing element;

a plurality of piezoresistors connected to the diaphragm, the plurality of piezoresistors being part of the pressure sensing element;

at least one layer of sealing glass connected to the diaphragm;

a base, the at least one layer of sealing glass connected to the base;

a first recess portion integrally formed as part of the at least one layer of sealing glass; and a second recess portion formed as part of the at least one layer of sealing glass on the opposite side of the at least one layer of sealing glass as the first recess portion;

wherein one of the plurality of piezoresistors is partially surrounded by the first recess portion, and another of the plurality of piezoresistors is partially surrounded by the second recess portion.

15. The pressure sensor assembly of claim 14, the at least one layer of sealing glass further comprising:

a first side surface, the first recess portion integrally formed as part of the first side surface; and a second side surface, the second recess portion integrally formed as part of the second side surface;

a first inner surface; and a second inner surface formed as part of the at least one layer of sealing glass on the opposite side of the at least one layer of sealing glass as the first inner surface;

wherein the first side surface is formed as part of the at least one layer of sealing glass on the opposite side of the at least one layer of sealing glass as the second side surface.

16. The pressure sensor assembly of claim 15, the first recess portion further comprising:

at least one side surface;

at least one fillet; and wherein the at least one side surface formed as part of the first recess portion and the first side surface terminate into the at least one fillet.

17. The pressure sensor assembly of claim 15, the second recess portion further comprising:

at least one side surface;

at least one fillet; and wherein the at least one side surface formed as part of the second recess portion and the second side surface terminate into the at least one fillet.

18. The pressure sensor assembly of claim 15, the at least one layer of sealing glass further comprising:

a first arc portion, an end of the first side surface and an end of the first inner surface both terminate into a first arc portion;

a second arc portion, a second end of the first side surface and a second end of the second inner surface both terminate into a second arc portion;

a third arc portion, a second end of the second side surface and a second end of the first inner surface both terminate into a third arc portion; and a fourth arc portion, an end of the second side surface and an end of the second inner surface both terminate into a fourth arc portion.

19. The pressure sensor assembly of claim 15, the at least one layer of sealing glass further comprising a multi-sided perimeter circumscribing the at least one layer of sealing glass.

20. The pressure sensor assembly of claim 15, the at least one layer of sealing glass further comprising:

a first curved surface, the first curved surface has a first end that terminates into the first side surface, and the first curved surface has a second end that terminates into the second side surface; and a second curved surface, the second curved surface has a first end that terminates into the first side surface, and the second curved surface has a second end that terminates into the second side surface;

wherein the first curved surface is formed as part of the at least one layer of sealing glass on the opposite side of the at least one layer of sealing glass as the second curved surface.

21. The pressure sensor assembly of claim 14, the at least one layer of sealing glass further comprising:

a first elongated curved surface, the first elongated curved surface has a first end that terminates into the first recess portion, and the first elongated curved surface has a second end that terminates into the second recess portion;

a second elongated curved surface, the second elongated curved surface has a first end that terminates into the first recess portion, and the first elongated curved surface has a second end that terminates into the second recess portion.

* * * * *